United States Patent
Kim et al.

(10) Patent No.: US 9,368,278 B2
(45) Date of Patent: Jun. 14, 2016

(54) MULTILAYER CERAMIC CAPACITOR, MANUFACTURING METHOD THEREOF, AND BOARD HAVING THE SAME MOUNTED THEREON

(71) Applicant: SAMSUNG ELECTRO-MECHANICS CO., LTD., Suwon, Gyunggi-do (KR)

(72) Inventors: Min Hoe Kim, Gyunggi-do (KR); Ji Young Park, Gyunggi-do (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 169 days.

(21) Appl. No.: 14/186,855

(22) Filed: Feb. 21, 2014

(65) Prior Publication Data

US 2015/0155097 A1 Jun. 4, 2015

(30) Foreign Application Priority Data

Dec. 3, 2013 (KR) ........................ 10-2013-0149337

(51) Int. Cl.
| | |
|---|---|
| *H01G 4/008* | (2006.01) |
| *H01G 4/30* | (2006.01) |
| *H01G 13/00* | (2013.01) |
| *H01G 4/12* | (2006.01) |
| *H05K 1/18* | (2006.01) |
| *H05K 1/11* | (2006.01) |
| *H01G 4/248* | (2006.01) |
| *H01G 4/012* | (2006.01) |
| *H01G 2/06* | (2006.01) |
| *H01G 4/232* | (2006.01) |

(52) U.S. Cl.
CPC ................ *H01G 4/008* (2013.01); *H01G 2/06* (2013.01); *H01G 4/012* (2013.01); *H01G 4/232* (2013.01); *H01G 4/30* (2013.01); *H01G 13/00* (2013.01); *H01G 4/12* (2013.01); *Y10T 29/417* (2015.01)

(58) Field of Classification Search
CPC ......... H01G 4/008; H01G 4/248; H01G 4/30; H01G 4/12; H01G 13/00; H05K 1/181; H05K 1/111; H05K 2201/10015
USPC ................ 361/301, 301.4; 174/260; 29/25.03
See application file for complete search history.

(56) References Cited

FOREIGN PATENT DOCUMENTS

| | | | |
|---|---|---|---|
| CN | 102543428 | * | 7/2012 |
| JP | 06-224005 | A | 8/1994 |
| JP | 08-290394 | * | 5/1998 |
| JP | 10-135065 | A | 5/1998 |
| JP | 10-189383 | A | 7/1998 |
| KR | 10-0586962 | B1 | 6/2006 |

OTHER PUBLICATIONS

Korean Office Action dated Nov. 17, 2014 in Korean Patent Application No. 10-2013-0149337 (English translation).

* cited by examiner

*Primary Examiner* — Timothy Thompson
*Assistant Examiner* — Charles Pizzuto
(74) *Attorney, Agent, or Firm* — McDermott Will & Emery LLP

(57) ABSTRACT

There is provided a multilayer ceramic capacitor including: a ceramic body having a plurality of dielectric layers and having first and second end surfaces opposing each other; a first internal electrode formed on each of the dielectric layers, including a first insulating part exposed to the second end surface, and exposed to the first end surface; a second internal electrode disposed to face the first internal electrode, having the dielectric layer interposed therebetween, and exposed to the first and second end surfaces; and a second insulating part formed on an edge of the second internal electrode exposed to the first end surface.

17 Claims, 7 Drawing Sheets

MULTILAYER CERAMIC CAPACITOR, MANUFACTURING METHOD THEREOF, AND BOARD HAVING THE SAME MOUNTED THEREON

CROSS-REFERENCE TO RELATED APPLICATION

This application claims the benefit of Korean Patent Application No. 10-2013-0149337 filed on Dec. 3, 2013, with the Korean Intellectual Property Office, the disclosure of which is incorporated herein by reference.

BACKGROUND

The present disclosure relates to a multilayer ceramic capacitor, a manufacturing method thereof, and a board having the same mounted thereon.

Among ceramic electronic components, a multilayer ceramic capacitor includes a plurality of stacked dielectric layers, internal electrodes disposed to face each other, having the dielectric layer interposed therebetween, and external electrodes electrically connected to the internal electrodes.

The multilayer ceramic capacitor has been widely used as a component for a computer, a mobile communication device such as a personal digital assistance (PDA), a mobile phone, or the like, due to advantages such as a small size, high capacitance, easiness of mounting, or the like.

Recently, as electronic products are miniaturized and multi-functionalized, chip components also tend to be miniaturized and multi-functionalized. Therefore, a small sized multilayer ceramic capacitor having high capacitance has been demanded.

RELATED ART DOCUMENT (Patent Document 1) Korean Patent Publication No. 10-0586962

SUMMARY

An aspect of the present disclosure may provide a multilayer ceramic capacitor, a manufacturing method thereof, and a board having the same mounted thereon.

According to an aspect of the present disclosure, a multilayer ceramic capacitor may include: a ceramic body having a plurality of dielectric layers and having first and second end surfaces opposing each other; a first internal electrode formed on each of the dielectric layers, including a first insulating part exposed to the second end surface, and exposed to the first end surface; a second internal electrode disposed to face the first internal electrode, having the dielectric layer interposed therebetween, and exposed to the first and second end surfaces; and a second insulating part formed on an edge of the second internal electrode exposed to the first end surface.

The first internal electrode may contain a first metal, and the second internal electrode may contain a second metal, the first metal having reactivity different from that of the second metal.

The first internal electrode may contain a first metal, and the second internal electrode may contain a second metal having reactivity smaller than that of the first metal.

The first internal electrode may contain a first metal, and the second internal electrode may contain a second metal, the first metal being easily oxidized as compared to the second metal.

The first internal electrode may contain a first metal, the second internal electrode may contain a second metal having reactivity smaller than that of the first metal, and the first insulating part may contain an oxide of the first metal.

The first internal electrode may contain a first metal, the second internal electrode may contain a second metal having reactivity smaller than that of the first metal, and the second insulating part may contain an oxide of a third metal having reactivity greater than that of the first metal.

A width of the first insulating part may be 2 to 50 μm.

A width of the second insulating part may be 2 to 50 μm.

According to another aspect of the present disclosure, a manufacturing method of a multilayer ceramic capacitor, the manufacturing method may include: preparing a ceramic body having first and second end surfaces opposing each other in a length direction and including dielectric layers, a first internal electrode formed on each of the dielectric layers and having both edges exposed to the first and second end surfaces in the length direction, and a second internal electrode disposed to face the first internal electrode, having the dielectric layer interposed therebetween, and having both edges exposed to the first and second end surfaces in the length direction; oxidizing the edge of the first internal electrode exposed to the second end surface to form a first insulating part; forming a plating part on the edge of the second internal electrode exposed to the first end surface; and oxidizing the plating part to form a second insulating part.

The first internal electrode may contain a first metal, and the second internal electrode may contain a second metal, the first metal having reactivity different from that of the second metal.

The first internal electrode may contain a first metal, and the second internal electrode may contain a second metal having reactivity smaller than that of the first metal.

The first internal electrode may contain a first metal, and the second internal electrode may contain a second metal, the first metal being easily oxidized as compared to the second metal.

The first internal electrode may contain a first metal, the second internal electrode may contain a second metal having reactivity smaller than that of the first metal, and the plating part may contain a third metal having reactivity greater than that of the first metal.

A width of the first insulating part may be 2 to 50 μm.

A width of the second insulating part may be 2 to 50 μm.

The preparing of the ceramic body may include: preparing a plurality of ceramic green sheets; forming first and second internal electrode patterns on the respective ceramic green sheets; preparing a laminate by stacking the ceramic green sheets in such a manner that the first and second internal electrode patterns face each other, having the ceramic green sheets interposed therebetween; and cutting the laminate such that both edges of the first and second internal electrode patterns in the length direction and both edges of the ceramic green sheet in the length direction coincide with each other, and then sintering the cut laminate.

According to another aspect of the present disclosure, a board having a multilayer ceramic capacitor mounted thereon may include: a printed circuit board having first and second electrode pads formed thereon; and the multilayer ceramic capacitor installed on the printed circuit board, wherein the multilayer ceramic capacitor includes a ceramic body including a plurality of dielectric layers and having first and second end surfaces opposing each other, a first internal electrode formed on each of the dielectric layers, including a first insulating part exposed to the second end surface, and exposed to the first end surface, a second internal electrode disposed to face the first internal electrode, having the dielectric layer interposed therebetween, and exposed to the first and second end surfaces, and a second insulating part formed on an edge of the second internal electrode exposed to the first end surface.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
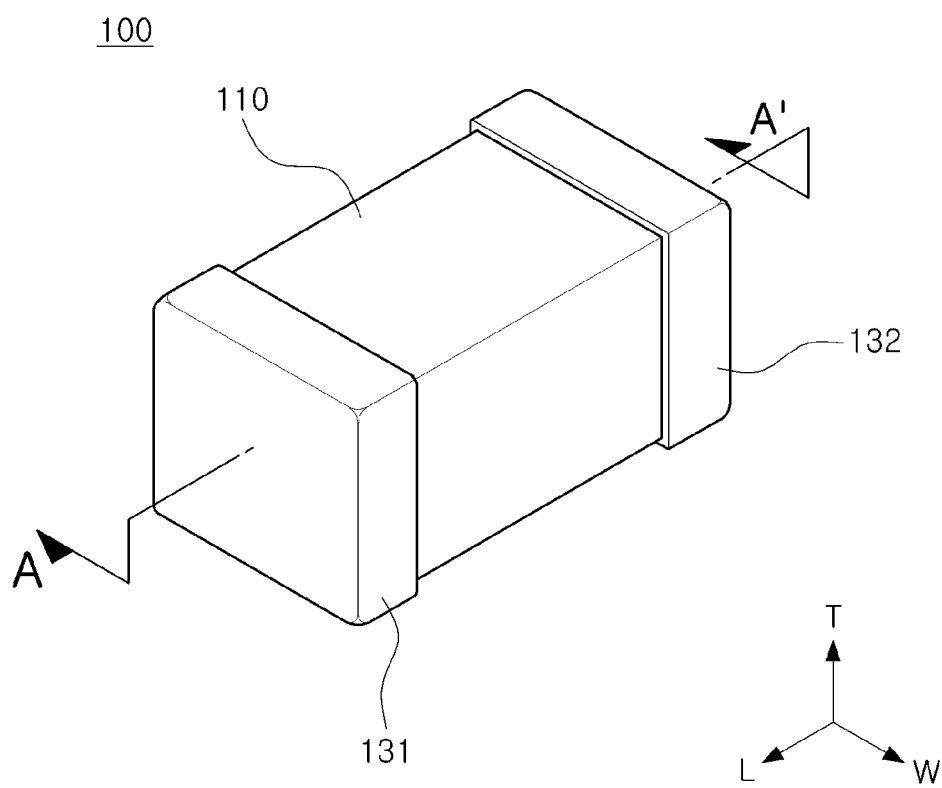
FIG. 1 is a perspective view showing a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
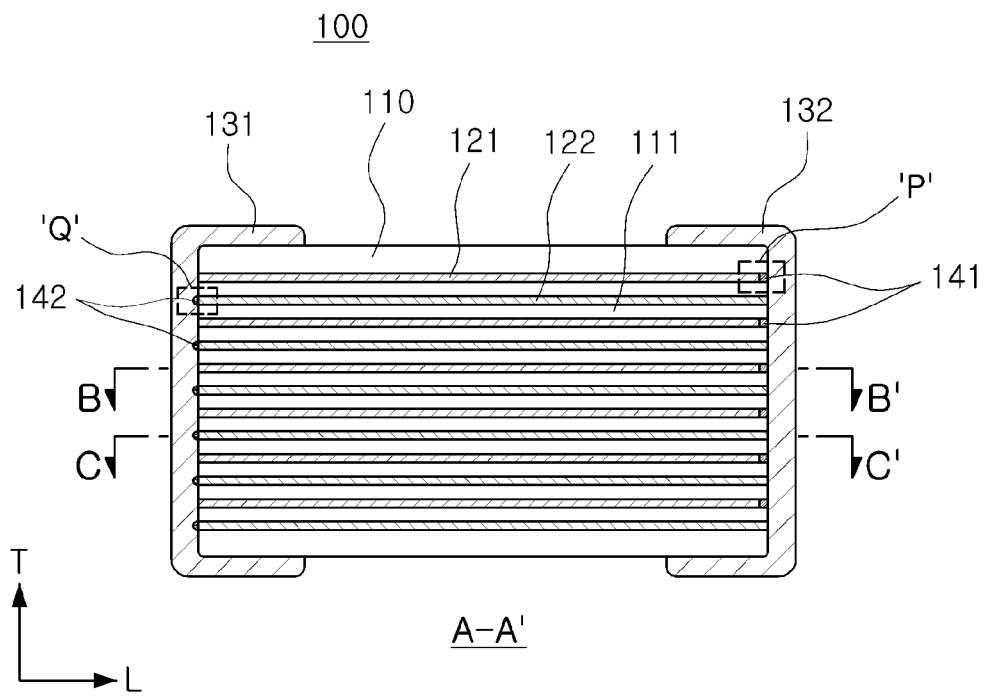
FIG. 2 is a cross-sectional view taken along line A-A' of FIG. 1.

FIG. 1 is a perspective view showing a multilayer ceramic capacitor 100 according to an exemplary embodiment of the present disclosure, and FIG. 2 is a cross-sectional view taken along line A-A' of FIG. 1.

Referring to FIGS. 1 and 2, the multilayer ceramic capacitor 100 according to an exemplary embodiment of the present disclosure may include a ceramic body 110; and external electrodes 131 and 132.

The ceramic body 110 may include an active layer as a part contributing to capacitance formation of the capacitor and upper and lower cover layers formed on upper and lower portions of the active layer as upper and lower margin parts, respectively. The active layer may include dielectric layers 111 and internal electrodes 121 and 122 and in this case, a plurality of first and second internal electrodes 121 and 122 may be alternately formed, having the dielectric layers 111 interposed therebetween.

In an exemplary embodiment of the present disclosure, a shape of the ceramic body 110 is not particularly limited, but may be substantially a hexahedral shape. A difference in a thickness may be generated according to the sintering shrinkage of a ceramic powder at the time of sintering a chip and the presence or absence of an internal electrode pattern, and edge parts of the ceramic body may be polished, such that the ceramic body 110 does not have a perfect hexahedral shape but may have a shape substantially close to a hexahedral shape.

Directions of a hexahedron will be defined in order to clearly describe the exemplary embodiments of the present disclosure. L, W and T shown in the accompanying drawings refer to a length direction, a width direction, and a thickness direction, respectively. Here, the thickness direction may be used to have the same concept as a direction in which dielectric layers are stacked. In an exemplary embodiment of the present disclosure, two outer surfaces of the ceramic body opposing each other in the length direction may be defined as first and second end surfaces.

A thickness of the dielectric layers 111 may be optionally changed according to the capacitance design of the multilayer ceramic capacitor. Preferably, a thickness of a single dielectric layer may be 0.1 to 10 μm after sintering, but the present disclosure is not limited thereto.

Further, the dielectric layers 111 may contain a ceramic powder having high permittivity, for example, a barium titanate ($BaTiO_3$) based powder or strontium titanate ($SrTiO_3$) based powder, or the like, but the present disclosure is not limited thereto.

The upper and lower cover layers may be formed of the same material and have the same configuration as those of the dielectric layers 111 except that internal electrodes are not included therein. The upper and lower cover layers may be formed by stacking a single or two or more dielectric layers on upper and lower surfaces of the active layer in a vertical direction, respectively, and generally serve to prevent the first and second internal electrodes 121 and 122 from being damaged by physical or chemical stress.

The internal electrodes may be configured of the first and second internal electrodes 121 and 122, and in this case, the first and second internal electrodes 121 and 122 may be disposed to face each other, having the dielectric layers 111 interposed therebetween. The first and second internal electrodes 121 and 122, a pair of electrodes having different polarities from each other, may be formed by printing a conductive paste containing a conductive metal on the dielectric layers 111 at a predetermined thickness and electrically insulated from each other by the dielectric layers 111 disposed therebetween.

A thickness of the first and second internal electrodes 121 and 122 as described above may be determined according to the use thereof. For example, the thickness may be determined to be in a range of 0.2 to 1.0 μm in consideration of a size of the ceramic body 110, but the present disclosure is not limited thereto.

The external electrodes may be configured of the first and second external electrodes 131 and 132, and in this case, the first external electrode 131 may be disposed on the first end surface of the ceramic body, and the second external electrode 132 may be disposed on the second end surface of the ceramic body.

The first and second external electrodes 131 and 132 may contain a conductive metal, and in this case, the conductive metal may be nickel (Ni), copper (Cu), palladium (Pd), silver (Ag), chromium (Cr), magnesium (Mg), zinc (Zn), aluminum (Al), or an alloy thereof, but the present disclosure is not limited thereto.

According to an exemplary embodiment of the present disclosure, the first and second internal electrodes 121 and 122 may be exposed to both end surfaces of the ceramic body 110. That is, the first internal electrode 121 may be exposed to the first and second end surfaces of the ceramic body, and the second internal electrode 122 may be exposed to the first and second end surfaces of the ceramic body. In other words, both edges of the first and second internal electrodes in the length direction may be exposed to the first and second end surfaces.

According to an exemplary embodiment of the present disclosure, the first and second internal electrodes 121 and 122 may be in a slightly depressed state and be exposed to the first and second end surfaces of the ceramic body due to a difference in a sintering shrinkage rate between a green sheet forming the dielectric layer 111 and an electrode paste forming the first and second internal electrodes.

According to an exemplary embodiment of the present disclosure, lengths of the first and second internal electrodes 121 and 122 and the dielectric layer 111 may be substantially the same each other within a range of errors caused by a difference in the shrinkage rate during the sintering.

Figure 3:
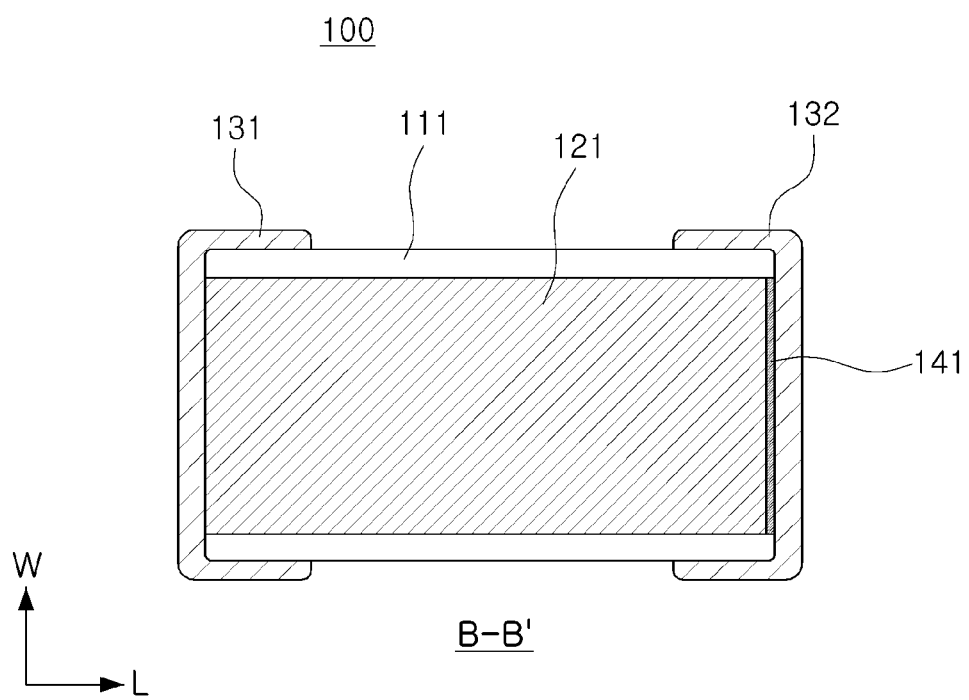
FIG. 3 is a cross-sectional view taken along line B-B' of FIG. 2.
Figure 4:
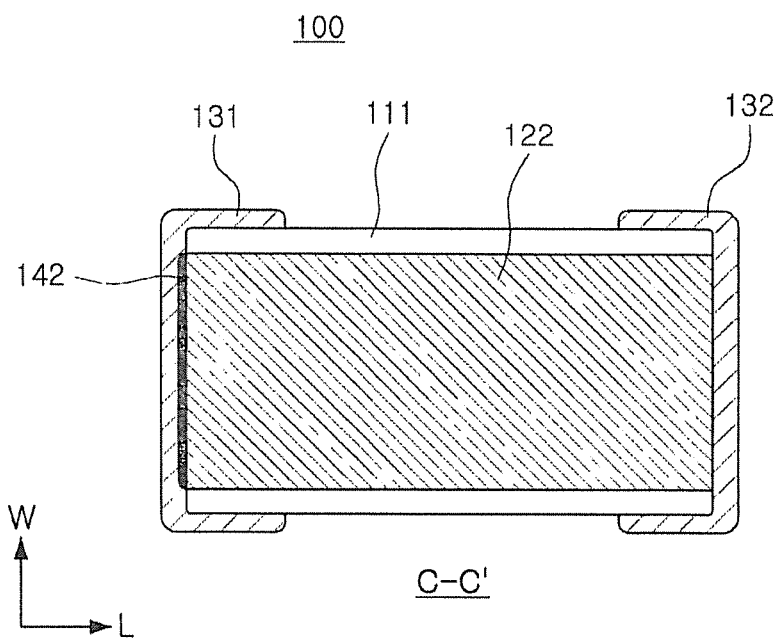
FIG. 4 is a cross-sectional view taken along line C-C' of FIG. 2.

FIG. 3 is a cross-sectional view taken along line B-B' of FIG. 2, and FIG. 4 is a cross-sectional view taken along line C-C' of FIG. 2.

Referring to FIGS. 2 and 3, the first internal electrode 121 according to an exemplary embodiment of the present disclosure may include a first insulating part 141, and in this case, the first insulating part 141 may be exposed to the second end surface of the ceramic body. That is, an edge of the first internal electrode exposed to the second end surface may be the first insulating part 141 formed by oxidation of a first metal contained in the first internal electrode 121.

That is, the first internal electrode 121 may include the first insulating part 141, and the first internal electrode including the first insulating part may be exposed to the first and second end surfaces of the ceramic body.

In other words, the length of the first internal electrode 121 including the first insulating part 141 may be equal to that of the dielectric layer 111. The first insulating part 141 may electrically insulate the first internal electrode 121 and the second external electrode 132 from each other, thereby preventing a short-circuit from being generated by electric conduction between the first internal electrode 121 and the second internal electrode 122.

According to an exemplary embodiment of the present disclosure, the first internal electrode 121 may contain the first metal, and the second internal electrode 122 may contain a second metal having different reactivity from that of the first metal.

More specifically, the first metal may have greater reactivity than that of the second metal to thereby be more easily oxidized as compared to the second metal. Therefore, the first insulating part may be formed by oxidizing the edge of the first internal electrode exposed to the second end surface while allowing the second end surface to which the first and second internal electrodes are exposed to be under conditions in which the first internal electrode is oxidized but the second internal electrode is not oxidized. That is, the first insulating part may contain an oxide of the first metal contained in the first internal electrode.

According to an exemplary embodiment of the present disclosure, referring to FIGS. 2 and 4, a second insulating part 142 may be formed in an edge of the second internal electrode 122 exposed to the first end surface. The second insulating part 142 may not be included in the second internal electrode 122 and may be provided as a separate configuration. That is, the second internal electrode may be exposed to the first and second end surfaces and has the same length as that of the dielectric layer 111.

The second insulating part 142 may electrically insulate the second internal electrode 122 and the first external electrode 131 from each other, thereby preventing a short-circuit from being generated by electric conduction between the first internal electrode 121 and the second internal electrode 122.

It may be considered that the first insulating part is formed in the inside of the ceramic body, but since the second insulating part is formed on the edge of the second internal electrode exposed to the first end surface, it may be considered that the second insulating part is formed on an outer portion of the ceramic body.

Although a concrete description will be made in a manufacturing method described below, the second insulating part 142 may be formed by oxidizing a separate metal (a plating part) formed at the edge of the second internal electrode exposed to the first end surface. The second insulating part 142 may be formed by plating a third metal having relativity greater than that of the first metal contained in the first internal electrode on the edge of the second internal electrode 122 exposed to the first end surface and then oxidizing the third metal.

In other words, the plating part may be formed by exposing both of the first and second internal electrode including the first and second metals, respectively, to the first end surface and then plating the third metal having reactivity greater than that of the first metal on the edge of the second internal electrode exposed to the second end surface. Thereafter, the second insulating part may be formed by oxidizing the plating part under the conditions in which the third metal is oxidized but the first internal electrode is not oxidized.

According to an exemplary embodiment of the present disclosure, the first metal may have reactivity greater than that of the second metal, and the third metal may have reactivity greater than that of the first metal. Although not limited thereto, the first to third metals may respectively include at least one of nickel (Ni), copper (Cu), palladium (Pd), a copper-zinc (Cu—Zn) alloy, a copper-aluminum (Cu—Al) alloy, a copper-magnesium (Cu—Mg) alloy, a nickel-aluminum (Ni—Al) alloy, a nickel-manganese alloy (Ni—Mn) alloy, a nickel-tungsten (Ni—W) alloy, and a nickel-chromium (Ni—Cr) alloy, the first metal may be selected to have reactivity greater than that of the second metal, and the third metal may be selected to have reactivity greater than that of the first metal.

According to an exemplary embodiment of the present disclosure, the first internal electrode 121 may be electrically insulated from the second external electrode 132 due to the first insulating part 141, and the second internal electrode 122 may be electrically insulated from the first external electrode 131 due to the second insulating part 142.

Therefore, the first external electrode 131 may be electrically connected to the first internal electrode 121, and the second external electrode 132 may be electrically connected to the second internal electrode 122.

When voltage is applied to the first and second external electrodes 131 and 132, electric charges are accumulated between the first and second internal electrodes 121 and 122 facing each other. In this case, capacitance of the multilayer ceramic capacitor 100 may be in proportion to an area of an overlapped region between the first and second internal electrodes 121 and 122.

Figure 5:
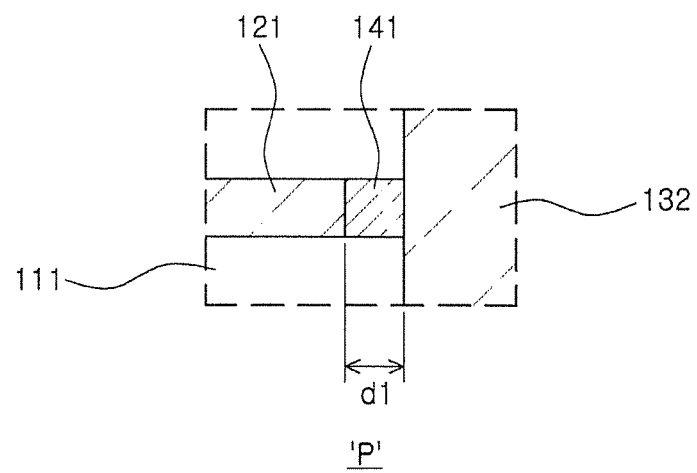
FIG. 5 is an enlarged view of part P of FIG. 2.

FIG. 5 is an enlarged view of part P of FIG. 2. Referring to FIG. 5, a width d1 of the first insulating part 141 according to an exemplary embodiment of the present disclosure may be 2

µm or more. In the case in which the width of the first insulating part 141 is below than 2 µm, the first internal electrode and the second external electrode may not be insulated from each other, such that the electric short-circuit may be generated.

In addition, preferably, the width of the first insulating part may be 50 µm or less. In the case in which the width of the first insulating part is greater than 50 µm, a crack may be generated in the ceramic body by an increase in a volume of the internal electrode due to oxidation thereof.

Figure 6:
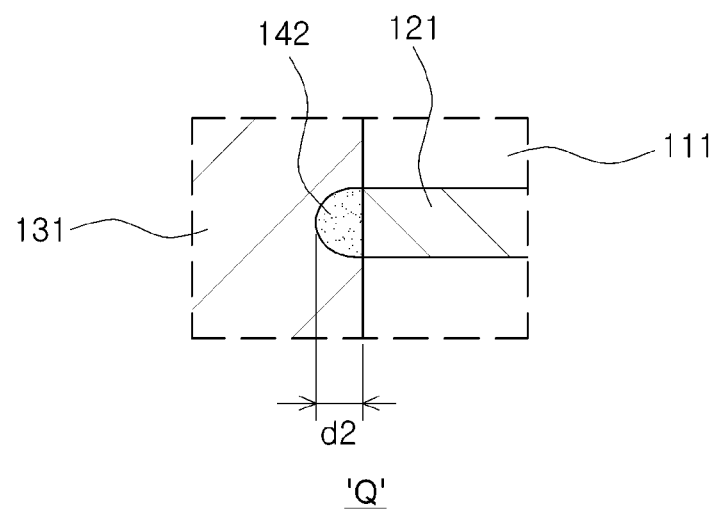
FIG. 6 is an enlarged view of part Q of FIG. 2.

FIG. 6 is an enlarged view of part Q of FIG. 2. Referring to FIG. 6, a width d2 of the second insulating part 142 according to an exemplary embodiment of the present disclosure may be 2 µm or more. In the case in which the width of the second insulating part 142 is below than 2 µm, the second internal electrode and the first external electrode may not be electrically insulated from each other, such that the electric short-circuit may be generated.

In addition, preferably, the width d2 of the second insulating part 142 may be 50 µm or less. In the case in which the width of the second insulating part is greater than 50 µm, it may be difficult to implement the symmetry of the first and second external electrodes due to an increase in a size of the second insulating part 142 protruding toward the first external electrode. In the case in which the symmetry of the first and second external electrodes is not implemented, a tombstone defect in which one electrode of the multilayer ceramic capacitor is lifted upwardly after a reflow process may be generated at the time of mounting the multilayer ceramic capacitor on a board.

Further, although not limited to, preferably, the widths of the first and second insulating parts 141 and 142 may be 50 µm or less in view of improvements in capacitance.

According to an exemplary embodiment of the present disclosure, a separate margin part is not formed in the length direction, such that the area of the overlapped portion between the first and second internal electrodes may be significantly increased, thereby providing a high capacitance multilayer ceramic capacitor. In addition, since a step may not be generated in the margin part in the length direction, warpage of the electrode by the step may not be generated, such that reliability of the multilayer ceramic capacitor may be improved.

Manufacturing Method of Multilayer Ceramic Capacitor

Figure 7:
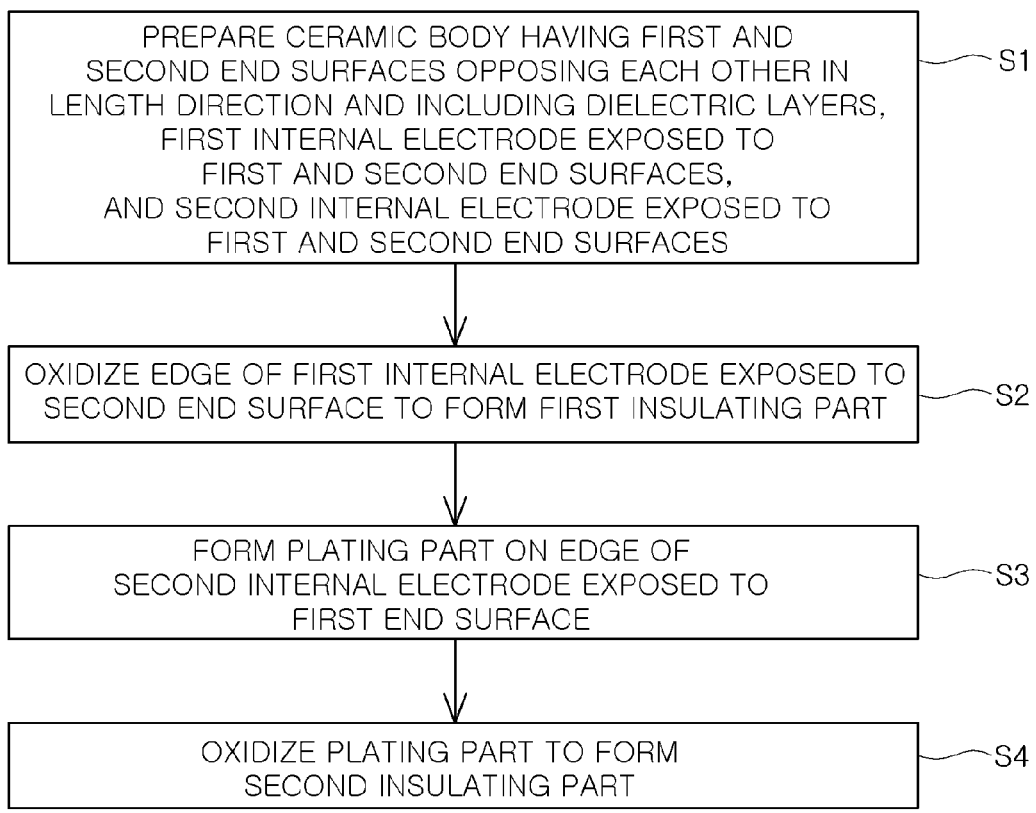
FIG. 7 is a manufacturing process chart showing a manufacturing method of a multilayer ceramic capacitor according to another exemplary embodiment of the present disclosure.

FIG. 7 is a manufacturing process chart showing a manufacturing method of a multilayer ceramic capacitor according to another exemplary embodiment of the present disclosure.

Referring to FIG. 7, the manufacturing method of a multilayer ceramic capacitor according the exemplary embodiment may include: preparing a ceramic body having first and second end surfaces opposing each other in a length direction and including dielectric layers, a first internal electrode formed on each of the dielectric layers and having both edges exposed to the first and second end surfaces in the length direction, and a second internal electrode disposed to face the first internal electrode, having the dielectric layer interposed therebetween, and having both edges exposed to the first and second end surfaces in the length direction (S1); oxidizing the edge of the first internal electrode exposed to the second end surface to form a first insulating part (S2); forming a plating part on the edge of the second internal electrode exposed to the first end surface (S3); and oxidizing the plating part to form a second insulating part (S4).

Hereinafter, a manufacturing method of a multilayer ceramic capacitor according to an exemplary embodiment of the present disclosure will be described, but is not limited thereto.

In addition, in describing the manufacturing method of a multilayer ceramic capacitor according to the exemplary embodiment, a description overlapped with that of the multilayer ceramic capacitor described above will be omitted.

In the manufacturing method of a multilayer ceramic capacitor according to an exemplary embodiment of the present disclosure, first, a slurry containing a powder such as a barium titanate ($BaTiO_3$) powder, or the like, may be applied to carrier films and dried thereon to prepare a plurality of ceramic green sheets, thereby forming dielectric layers and cover layers.

The ceramic green sheets may be manufactured by mixing a ceramic powder, a binder, and a solvent to prepare the slurry and manufacturing the prepared slurry in a sheet shape having a thickness of several µm by a doctor blade method.

Next, a conductive paste for the first internal electrode containing the first metal and a conductive paste for the second internal electrode containing the second metal may be prepared.

After applying the conductive pastes for the first and second internal electrodes to the respective green sheets to form first and second internal electrode patterns, a plurality of ceramic green sheets on which the internal electrode patterns are printed may be stacked in such a manner that the first and second internal electrode patterns face each other, having the ceramic green sheets interposed therebetween, and a plurality of green sheets on which the internal electrode patterns are not formed may be stacked on upper and lower surfaces of the ceramic green sheets on which the internal electrode patterns are printed, thereby preparing a laminate.

Thereafter, a ceramic body may be formed by sintering the laminate.

In the case in which lengths of the first and second internal electrode patterns are not equal to that of the ceramic green sheet in the laminate, a process of cutting the laminate in such a manner that the lengths of the first and second internal electrode patterns are equal to that of the ceramic green sheets may be performed and then a sintering process may be performed thereon, thereby forming the ceramic body. That is, the laminate may be cut so that both edges of the first and second internal electrode patterns in the length direction and both end portions of the ceramic green sheet in the length direction coincide with each other, and then be sintered, thereby forming the ceramic body.

The ceramic body may include internal electrodes 121 and 122, the dielectric layers 111, and the cover layers, and in this case, the dielectric layers may be formed by firing the green sheets on which internal electrodes are printed, and the cover layers are formed by firing the green sheets on which the internal electrodes are not printed.

According to an exemplary embodiment of the present disclosure, the first internal electrode 121 may contain the first metal, and the second internal electrode 122 may contain the second metal having different reactivity from that of the first metal.

More specifically, the first metal may have greater reactivity as that of the second metal to thereby be more easily oxidized as compared to the second metal. Therefore, in the case of dipping the second end surface to which edges of the first and second internal electrodes are exposed in a solution containing a first oxidant oxidizing the first internal electrode but not oxidizing the second internal electrode, a part of the first internal electrode adjacent to the second end surface may be oxidized, thereby forming the first insulating part 141. That is, the first oxidant may be a material having oxidizing power on a level on which the first metal is oxidized but the second metal is not oxidized.

Then, the plating part may be formed on the edge of the second internal electrode exposed to the first surface. The edge of the first internal electrode exposed to the second end surface is in an insulated state due to formation of the first insulating part, but the edges of the second internal electrode exposed to the first and second end surfaces may be electrically conducted to each other. Therefore, the plating part may be formed on the edge of the second internal electrode exposed to the first end surface while allowing the plating part not to be formed on the edge of the first internal electrode exposed to the first end surface. That is, when the first end surface is dipped in a plating solution and current is allowed to flow in the internal electrodes of the ceramic body via the second end surface, since current flows only in the second internal electrode of which the edge exposed to the second end surface is not insulated, the plating part may be formed on the edge of the second internal electrode exposed to the second end surface.

The plating part may be formed by plating a third metal, and in this case, the third metal may have reactivity greater than that of the first metal. In other words, the third metal may include a metal capable of being easily oxidized as compared to the first metal.

Next, when the first end surface of the ceramic body on which the plating part is formed is dipped in a solution containing a second oxidant oxidizing the plating part while not oxidizing the first internal electrode, the plating part may be oxidized, thereby forming the second insulating part 142. That is, the second oxidant may be a material having oxidizing power on a level on which the third metal is oxidized but the first metal is not oxidized.

According to an exemplary embodiment of the present disclosure, the first metal may have reactivity greater than that of the second metal, and the third metal may have reactivity greater than that of the first metal. Although not limited thereto, the first to third metals may include at least one of nickel (Ni), copper (Cu), palladium (Pd), a copper-zinc (Cu—Zn) alloy, a copper-aluminum (Cu—Al) alloy, a copper-magnesium (Cu—Mg) alloy, a nickel-aluminum (Ni—Al) alloy, a nickel-manganese alloy (Ni—Mn) alloy, a nickel-tungsten (Ni—W) alloy, and a nickel-chromium (Ni—Cr) alloy, the first metal may be selected to have reactivity greater than that of the second metal, and the third metal may be selected to have reactivity greater than that of the first metal.

Therefore, a region of the first internal electrode exposed to the second end surface may be electrically insulated from the second external electrode by the first insulating part, and a region of the second internal electrode exposed to the first end surface may be electrically insulated from the first external electrode by the second insulating part. In addition, the first external electrode 131 may be electrically connected to the first internal electrode 121, and the second external electrode 132 may be electrically connected to the second internal electrode 122.

During a process of forming the first insulating part, the first internal electrode may be oxidized so that the width of the first insulating part is 2 to 50 μm.

The plating part may be formed so that the width of the second insulating part formed after oxidation is 2 to 50 μm.

Thereafter, the first external electrode 131 may be formed on the first end surface of the ceramic body, and the second external electrode 132 may be formed on the second end surface thereof. The first and second external electrodes may be formed by sintering a paste containing a conductive metal and glass.

The conductive metal is not particularly limited, but may be, for example, at least one selected from a group consisting of copper (Cu), silver (Ag), nickel (Ni), and an alloy thereof.

According to an exemplary embodiment of the present disclosure, an area of an overlapped portion of the first and second internal electrodes may be significantly increased, such that a high capacitance multilayer ceramic capacitor may be provided.

Board Having Multilayer Ceramic Capacitor Mounted Thereon

Figure 8:
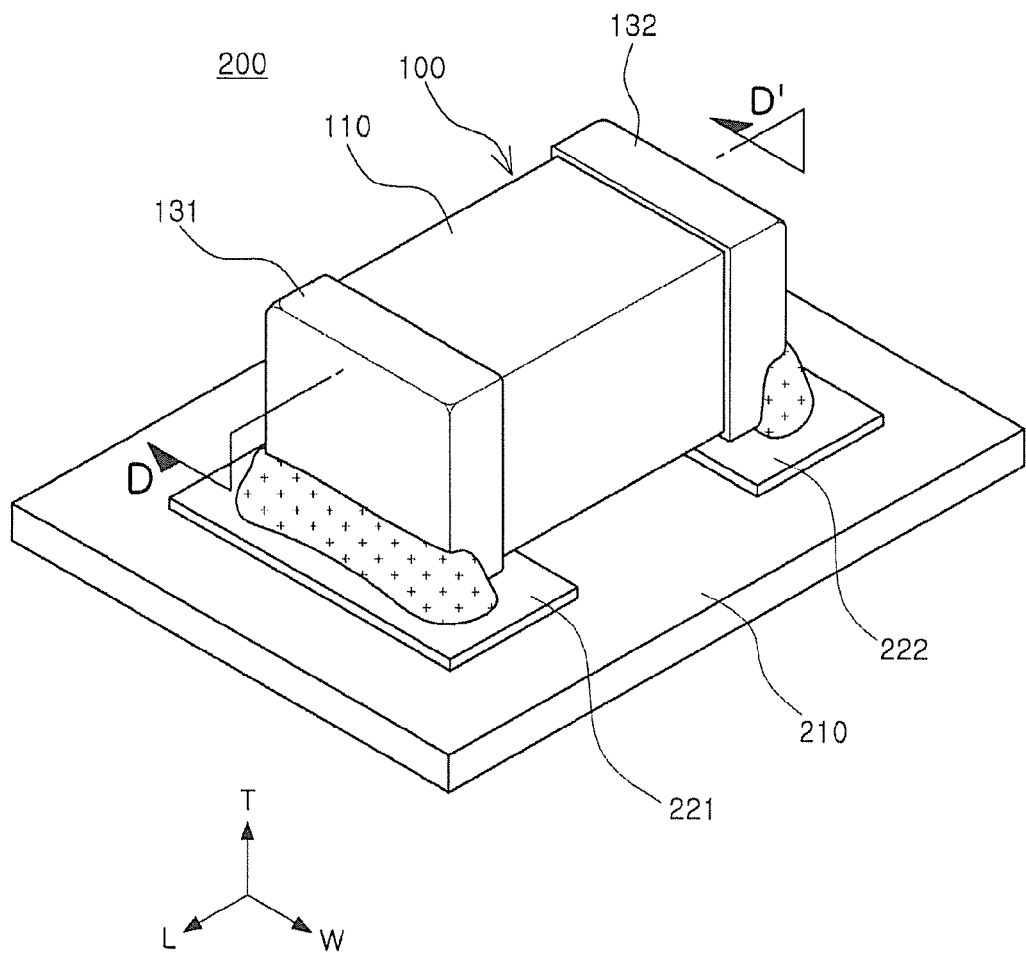
FIG. 8 is a schematic perspective view showing a board having a multilayer ceramic capacitor mounted thereon according to another exemplary embodiment of the present disclosure.
Figure 9:
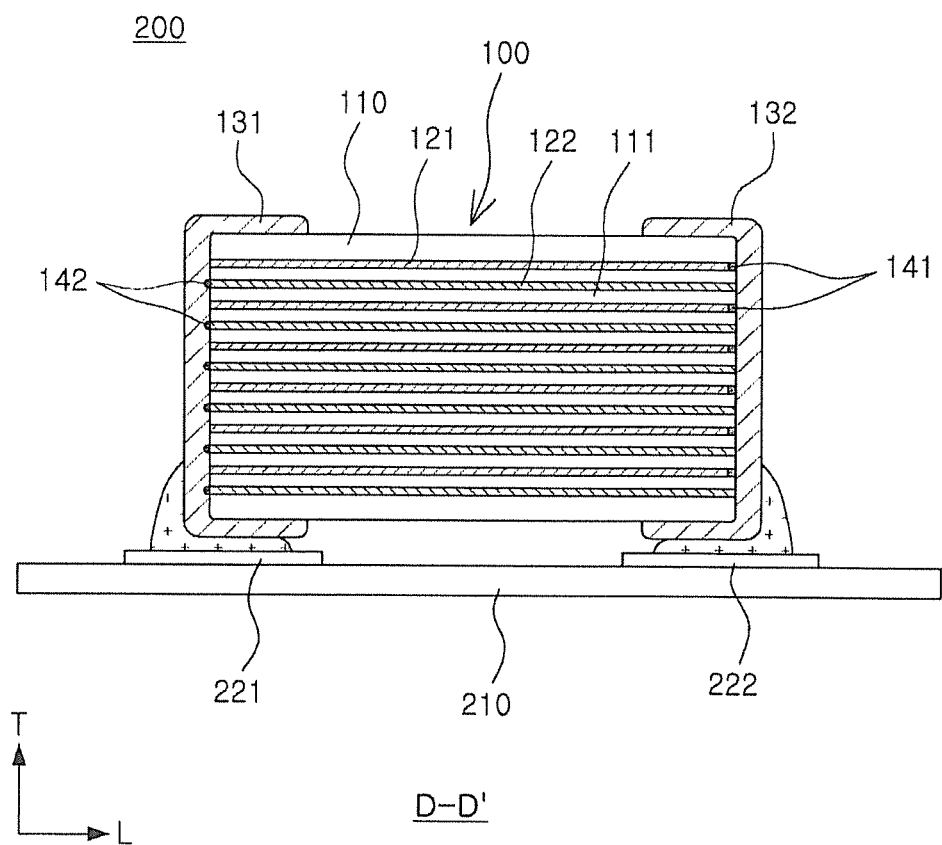
FIG. 9 is a cross-sectional view taken along line D-D' of FIG. 8.

FIG. 8 is a schematic perspective view showing a board having a multilayer ceramic capacitor mounted thereon according to another exemplary embodiment of the present disclosure, and FIG. 9 is a cross-sectional view taken along line D-D' of FIG. 8.

Referring to FIGS. 8 and 9, a board 200 having a multilayer ceramic capacitor mounted thereon according to the exemplary embodiment of the present disclosure may include: a printed circuit board 210 having first and second electrode pads 221 and 222 formed thereon; and the multilayer ceramic capacitor 100 installed on the printed circuit board, and in this case, the multilayer ceramic capacitor includes a ceramic body including a plurality of dielectric layers and having first and second end surfaces opposing each other, a first internal electrode formed on each of the dielectric layers, including a first insulating part exposed to the second end surface, and exposed to the first end surface, a second internal electrode disposed to face the first internal electrode, having the dielectric layer interposed therebetween, and exposed to the first and second end surfaces, and a second insulating part formed on an edge of the second internal electrode exposed to the first end surface.

The multilayer ceramic capacitor may include the first external electrode 131 connected to the first internal electrode 121 and the second external electrode 132 connected to the second internal electrode 122 and may be mounted such that the first and second external electrodes may be connected to the first and second electrode pads 221 and 222, respectively.

In the contents of the board having a multilayer ceramic capacitor mounted thereon, a description thereof overlapped with that of the above-mentioned multilayer ceramic capacitor will be omitted in order to avoid a repeated description.

EXPERIMENTAL EXAMPLE

In the Experimental Example, a first internal electrode was formed using a paste containing nickel (Ni), and a second internal electrode was formed using a paste containing copper (Cu). A first insulating part was formed by oxidizing one edge of the first internal electrode, and a second insulating part was formed by forming a plating part on one edge of the second internal electrode using a copper-aluminum (Cu—Al) alloy and then oxidizing the formed plating part.

The following table 1 shows results obtained by observing a short-circuit occurrence rate and a crack defect associated with whether or not a crack was generated according to a thickness of the first insulating part.

In order to measure the short-circuit occurence rate, after forming an external electrode containing copper, a voltage (120 Hz, 0.5 V) was applied to the external electrode, and whether or not the electric short-circuit was generated was measured. Further, the occurrence of cracks was evaluated by observing whether or not a crack or break was generated in a ceramic body of a multilayer ceramic capacitor.

TABLE 1

| Sample | Thickness of First Insulating part (μm) | Short-Circuit Occurrence Rate (%) | Crack Generation |
|---|---|---|---|
| 1 | 0 | 100 | OK |
| 2 | 1 | 78 | OK |
| 3 | 2 | 24 | OK |
| 4 | 3 | 20 | OK |
| 5 | 4 | 19 | OK |
| 6 | 6 | 18 | OK |
| 7 | 10 | 18 | OK |
| 8 | 20 | 15 | OK |
| 9 | 30 | 16 | OK |
| 10 | 40 | 13 | OK |
| 11 | 50 | 14 | OK |
| 12 | 60 | 12 | NG |
| 13 | 70 | 10 | NG |

It may be confirmed through the Table 1 that in the case in which the thickness of the first insulating part was below 2 μm, the short-circuit occurrence rate was significantly high and exceeded 70%, and in the case in which the thickness of the first insulating part was greater than 50 μm, the crack was generated in the ceramic body.

The following table 2 shows results obtained by evaluating a short-circuit occurrence rate and whether or not a tombstone defect was generated according to a thickness of the second insulating part.

The tombstone defect refers to a phenomenon in which one electrode of the multilayer ceramic capacitor is lifted upwardly after a reflow process during the mounting a multilayer ceramic capacitor, and among 500 capacitors, the number of capacitors in which tombstone defect was generated after the reflow process was determined.

TABLE 2

| Sample | Thickness of Second Insulating part (μm) | Short-Circuit Occurrence Rate (%) | Tombstone Generation |
|---|---|---|---|
| 1 | 0 | 100 | 0/500 |
| 2 | 1 | 81 | 0/500 |
| 3 | 2 | 24 | 0/500 |
| 4 | 3 | 22 | 0/500 |
| 5 | 4 | 18 | 0/500 |
| 6 | 6 | 18 | 0/500 |
| 7 | 10 | 17 | 0/500 |
| 8 | 20 | 15 | 0/500 |
| 9 | 30 | 14 | 0/500 |
| 10 | 40 | 14 | 0/500 |
| 11 | 50 | 13 | 0/500 |
| 12 | 60 | 11 | 12/500 |
| 13 | 70 | 10 | 24/500 |

It may be confirmed through the Table 2 that in the case in which the thickness of the second insulating part was below 2 μm, the short-circuit occurrence rate was significantly high (exceeded 70%), and in the case in which the thickness of the second insulating part was greater than 50 μm, the number of generated tombstone defect was increased.

As set forth above, according to exemplary embodiments of the present disclosure, the high capacitance multilayer ceramic capacitor, the manufacturing method thereof, and the board having a multilayer ceramic capacitor mounted thereon may be provided.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor comprising:
    a ceramic body having a plurality of dielectric layers and having first and second end surfaces opposing each other;
    a first internal electrode formed on each of the dielectric layers, including a first insulating part exposed to the second end surface, and exposed to the first end surface;
    a second internal electrode disposed to face the first internal electrode, having the dielectric layer interposed therebetween, and exposed to the first and second end surfaces; and
    a second insulating part formed on an edge of the second internal electrode exposed to the first end surface,
    wherein the first insulating part has a composition different than that of the second insulating part.

2. The multilayer ceramic capacitor of claim 1, wherein the first internal electrode contains a first metal, and the second internal electrode contains a second metal, the first metal having reactivity different from that of the second metal.

3. The multilayer ceramic capacitor of claim 1, wherein the first internal electrode contains a first metal, and the second internal electrode contains a second metal having reactivity smaller than that of the first metal.

4. The multilayer ceramic capacitor of claim 1, wherein the first internal electrode contains a first metal, and the second internal electrode contains a second metal, the first metal being easily oxidized as compared to the second metal.

5. The multilayer ceramic capacitor of claim 1, wherein the first internal electrode contains a first metal, the second internal electrode contains a second metal having reactivity smaller than that of the first metal, and the first insulating part contains an oxide of the first metal.

6. The multilayer ceramic capacitor of claim 1, wherein the first internal electrode contains a first metal, the second internal electrode contains a second metal having reactivity smaller than that of the first metal, and the second insulating part is formed of an oxide of a third metal having reactivity greater than that of the first metal.

7. The multilayer ceramic capacitor of claim 1, wherein a width of the first insulating part is 2 to 50 μm.

8. The multilayer ceramic capacitor of claim 1, wherein a width of the second insulating part is 2 to 50 μm.

9. A manufacturing method of a multilayer ceramic capacitor, the manufacturing method comprising:
    preparing a ceramic body having first and second end surfaces opposing each other in a length direction and including dielectric layers, a first internal electrode formed on each of the dielectric layers and having both edges exposed to the first and second end surfaces in the length direction, and a second internal electrode disposed to face the first internal electrode, having the dielectric layer interposed therebetween, and having both edges exposed to the first and second end surfaces in the length direction;
    oxidizing the edge of the first internal electrode exposed to the second end surface to form a first insulating part;
    forming a plating part on the edge of the second internal electrode exposed to the first end surface; and
    oxidizing the plating part to form a second insulating part.

10. The manufacturing method of claim 9, wherein the first internal electrode contains a first metal, and the second internal electrode contains a second metal, the first metal having reactivity different from that of the second metal.

11. The manufacturing method of claim 9, wherein the first internal electrode contains a first metal, and the second internal electrode contains a second metal having reactivity smaller than that of the first metal.

12. The manufacturing method of claim 9, wherein the first internal electrode contains a first metal, and the second internal electrode contains a second metal, the first metal being easily oxidized as compared to the second metal.

13. The manufacturing method of claim 9, the first internal electrode contains a first metal, the second internal electrode contains a second metal having reactivity smaller than that of the first metal, and the plating part contains a third metal having reactivity greater than that of the first metal.

14. The manufacturing method of claim 9, wherein a width of the first insulating part is 2 to 50 μm.

15. The manufacturing method of claim 9, wherein a width of the second insulating part is 2 to 50 μm.

16. The manufacturing method of claim 9, wherein the preparing of the ceramic body includes:
   preparing a plurality of ceramic green sheets;
   forming first and second internal electrode patterns on the respective ceramic green sheets;
   preparing a laminate by stacking the ceramic green sheets in such a manner that the first and second internal electrode patterns face each other, having the ceramic green sheets interposed therebetween; and
   cutting the laminate such that both edges of the first and second internal electrode patterns in the length direction and both edges of the ceramic green sheet in the length direction coincide with each other, and then sintering the cut laminate.

17. A board having a multilayer ceramic capacitor mounted thereon, the board comprising:
   a printed circuit board having first and second electrode pads formed thereon; and
   the multilayer ceramic capacitor installed on the printed circuit board,
   wherein the multilayer ceramic capacitor includes a ceramic body including a plurality of dielectric layers and having first and second end surfaces opposing each other, a first internal electrode formed on each of the dielectric layers, including a first insulating part exposed to the second end surface, and exposed to the first end surface, a second internal electrode disposed to face the first internal electrode, having the dielectric layer interposed therebetween, and exposed to the first and second end surfaces, and a second insulating part formed on an edge of the second internal electrode exposed to the first end surface,
   wherein the first insulating part has a composition different than that of the second insulating part.

\* \* \* \* \*